June 5, 1928.
N. W. CUMMINS
1,672,711
HANDLE RETAINING MEANS FOR AUTOMOBILE DOORS
Filed April 20, 1926
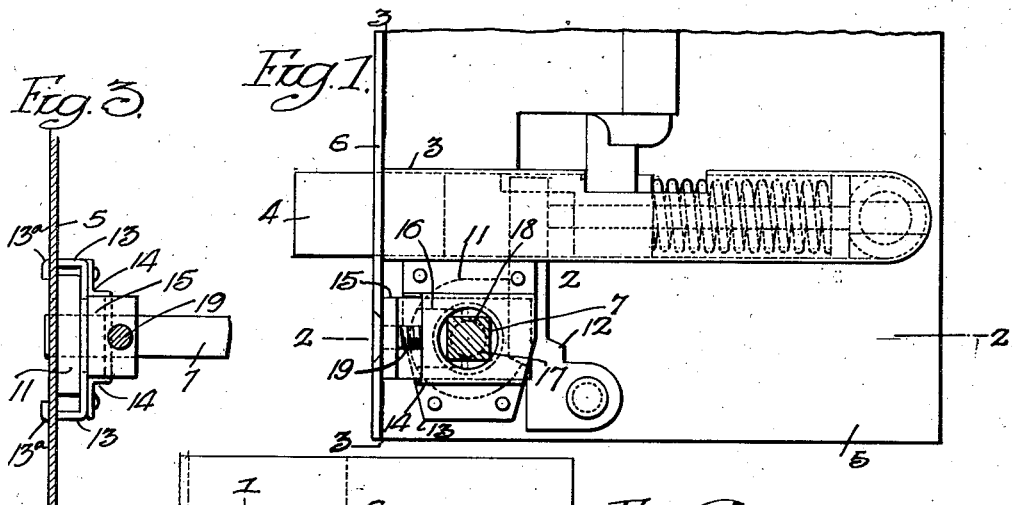
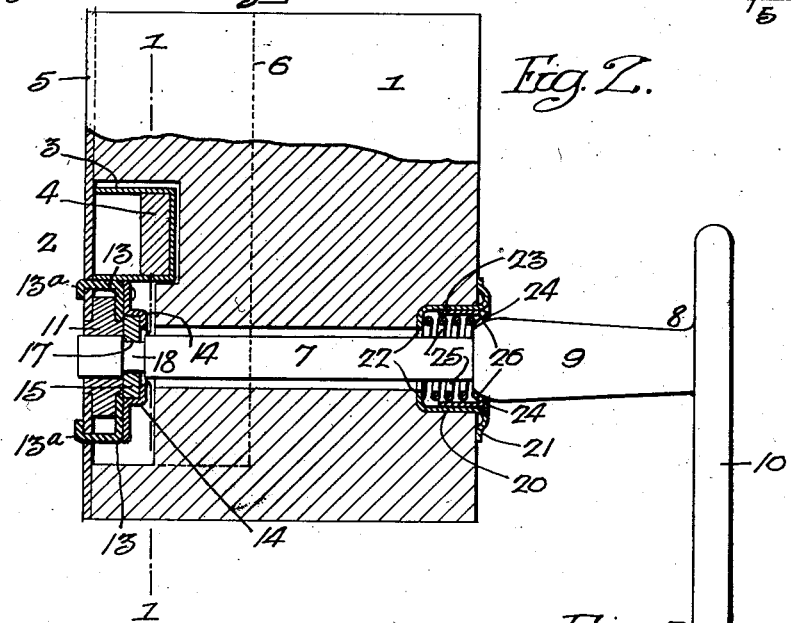
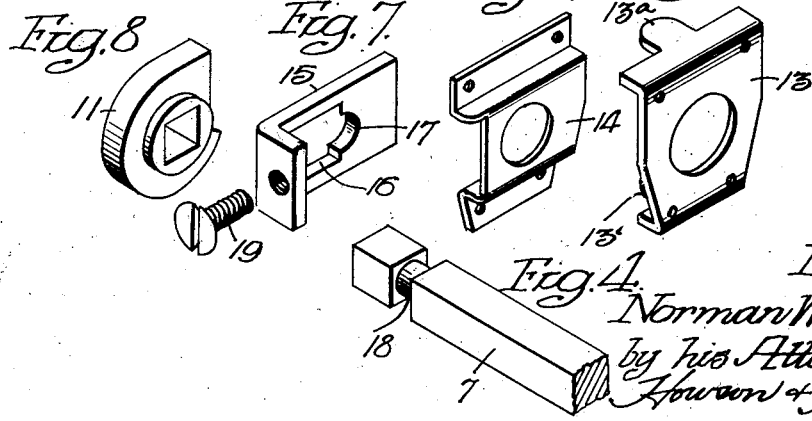
Inventor
Norman W. Cummins
by his Attorneys
Howson & Howson Patented June 5, 1928.

1,672,711

UNITED STATES PATENT OFFICE.

NORMAN W. CUMMINS, OF PLYMOUTH, MICHIGAN, ASSIGNOR TO THE YALE & TOWNE MANUFACTURING COMPANY, OF STAMFORD, CONNECTICUT, A CORPORATION OF CONNECTICUT.

HANDLE-RETAINING MEANS FOR AUTOMOBILE DOORS.

Application filed April 20, 1926. Serial No. 103,294.

One object of my invention is to dispense with the usual escutcheon plate, and to provide means within the latch structure for securing the handle in position.

A further object of the invention is to provide means for taking up any lost motion due to the differences in the thickness of doors.

The invention also relates to certain details which will be described fully hereinafter.

In the accompanying drawing:

Fig. 1 is a view of a portion of an automobile latch structure illustrating my invention, the view being a sectional view taken on the line 1—1, Fig. 2;

Fig. 2 is a sectional view on the line 2—2, Fig. 1;

Fig. 3 is a sectional view on the line 3—3, Fig. 1;

Fig. 4 is a perspective view of a portion of the handle;

Figs. 5, 6, 7 and 8 are perspective views illustrating details of the invention.

1 is a door of an automobile or other vehicle. 2 is a latch structure, which has a casing 3 for the bolt 4, which has a beveled end which engages a keeper on the door frame. 5 is the inner plate of the latch structure and 6 is the end plate.

The shank 7 of the handle 8 is rectangular in cross-section and is fitted into a shell 9 having an angular extension 10 forming a handhold, by which the handle is turned. The shank 7 extends into the casing of the latch structure and has at its inner end a cam 11, which controls the movement of the bolt 4 through a lever 12.

Enclosing the cam is a plate 13, having ears 13ª which extend through the plate 5. Riveted to the plate 13 is a plate 14, which is spaced from the plate 13 so as to form a slideway for a block 15, Fig. 7. This block has a rectangular opening 16 therein, which is reduced at one end as at 17. The shank 7 extends through openings in the two plates 13 and 14 and through the rectangular opening 16 in the block 15, and has a notched portion 18 which, when the block is moved longitudinally by the screw 19, the reduced portion 17 of the slot will be moved into the notched portion of the shank, so that the shoulders on the shank will be engaged by the block and thus prevent the withdrawal of the handle.

The opening for the handle is enlarged at the outer side of the door to receive a thimble 20, having a flange 21 which rests against the outside of the door, as shown in Fig. 2. This thimble has an internal flange 22. Within the thimble is a sleeve 23 having an inturned flange 24, and between the flanges 24 and 22 is located the spiral spring 25, which tends to force the sleeve outwardly. The inturned flange of the sleeve is shaped to conform to a socket for a ball portion 26 of the handle 8, so that any slight variation in the doors will be taken up by this spring.

To detach the handle from the latch structure, all that is necessary is to turn the screw 19 so as to move the block 15 into such position that the shank 7 of the handle will be in the enlarged portion of the block, after which it can be withdrawn, and when the handle is replaced, it is pushed in position, and the screw turned so as to shift the block to bring the narrow portion of the opening therein in engagement with the notched portion of the shank, thus locking the handle in position.

The handle may extend through the back plate of the lock or may terminate within the latch structure, as desired, and while the locking block is shown near the inner end of the latch structure, it may be placed in other positions, without departing from the essential features of the invention.

I claim:

1. The combination in a handle spindle retaining means for a latch or the like for automobile and other doors, of a casing secured to said door and having a slideway formed therein; a block adapted to the slideway and having an opening therein, one end of the opening being reduced in width; a handle spindle extending through the door and into the opening in said slide block having a reduced portion arranged to be engaged by and rotate within the reduced portion of said opening in the block to prevent the withdrawal of the handle.

2. The combination in a handle spindle retaining means for a latch or the like for automobile and other doors, of a casing having a slideway; a block adapted to the slideway and having an opening therein, one end of the opening being reduced in width; a handle spindle extending through the door and into the casing and a portion arranged to be engaged by the block to prevent the withdrawal of the handle; and yielding means engaging the handle for taking up any lost motion due to differences in thickness of doors.

3. The combination in a handle spindle retaining means for a latch or the like of a door; a latch casing; a handle having a rectangular shank extending into the latch casing; means in the latch casing for engaging the shank to prevent its withdrawal; a thimble located in an opening in the outer surface of the door; a sleeve within the thimble and having an inturned flange forming a concaved socket in the outer end of said sleeve, the handle having a ball-shaped portion fitting within said socket; and a spring within the thimble arranged to press the sleeve socket against the bell-shaped portion of said handle to take up any lost motion due to differences in thickness of doors.

4. The combination in a handle spindle retaining means for a latch or the like of a door; a latch structure mounted on the door; a handle extending through the door and into the latch structure and having means for actuating a bolt, the shank having a notched portion; a casing having openings through which the shank extends; a sliding block mounted in the casing and having an enlarged opening to allow the free movement of the shank and having a reduced portion arranged to be located within the notch of the shank; and a screw extending through the casing of the block and engaging the block, said screw being arranged to shift the block into engagement with the shank.

NORMAN W. CUMMINS.